June 13, 1967 R. H. KROCK ET AL 3,324,713
MICRO-TENSILE TESTING MACHINE
Filed Feb. 24, 1965 4 Sheets-Sheet 1

INVENTORS
RICHARD H. KROCK
ROBERT H. KELSEY
HANS R. CAMENZIND
GEORGE WALLIS
BY
ATTORNEY

INVENTORS
RICHARD H. KROCK
ROBERT H. KELSEY
HANS R. CAMENZIND
GEORGE WALLIS

INVENTORS
RICHARD H. KROCK
ROBERT H. KELSEY
HANS R. CAMENZIND
GEORGE WALLIS
BY
ATTORNEY

INVENTORS
RICHARD H. KROCK
ROBERT H. KELSEY
HANS R. CAMENZIND
GEORGE WALLIS
BY

ATTORNEY

United States Patent Office 3,324,713
Patented June 13, 1967

3,324,713
MICRO-TENSILE TESTING MACHINE
Richard H. Krock, Peabody, Robert H. Kelsey, West Acton, and Hans R. Camenzind and George Wallis, Lexington, Mass., assignors to P. R. Mallory & Co. Inc., Indianapolis, Ind., a corporation of Delaware
Filed Feb. 24, 1965, Ser. No. 434,849
9 Claims. (Cl. 73—95)

ABSTRACT OF THE DISCLOSURE

A whisker tensile testing device in which the whisker is mounted between a pair of capillary tubes. The lower tube is fixed in position on an alignment bracket, and the upper tube is held by a chuck mounted on the alignment bracket to prevent movement before the test. Mounted on the upper tube is one element of a capacitor strain gage, the other element of which is mounted on the alignment bracket. Testing force is applied to the upper rod by a modified analytical balance, while the specimen strain is indicated on a capacitance sensing bridge.

---

The present invention relates to a tensile testing machine for use on microscopic specimens and more particularly, relates to a tensile testing machine which provides a means for investigating the mechanical properties of whiskers and other small inorganic or organic fibers.

Tensile testing machines for investigating the mechanical properties of whiskers are well known in the art. A few devices using electrical or electronic extension detectors have been described, but appreciable electronic drift has limited their usefulness.

Present optical micro-tensile testing devices require the application of two marking beads on a whisker and visually measuring the change in the distance between the beads while a load is applied to the whisker. Such visual measurements, however, lead to operator fatigue and resulting error as well as susceptibility to error because of mechanial vibrations. Thus, reproducible readings are difficult to obtain over long periods of time. Since the known devices are both expensive and suffer the aforementioned disadvantages, there has been a long-standing need in the art for an economical, high resolution, micro-tensile testing device for evaluating the mechanical properties of whiskers or fine fibers and filaments.

It is an object of the present invention to provide a micro-tensile testing machine which overcomes the disadvantages of prior art.

It is also an object of the present invention to provide a micro-tensile testing machine which electronically measures the stress-strain characteristics of whiskers as well as other fibers or filaments.

The present invention, in another of its aspects, relates to the novel features of the instrumentalities described herein for teaching the principal object of the invention and to the novel prinicples employed in the instrumentalities whether or not these features and prinicples may be used in the said object or in the said field.

Other objects of the invention, and the nature thereof, will become apparent from the following description taken in conjunction with the accompanying figures of the drawings wherein like reference characters describe the elements of similar function, and wherein the scope of the invention is determined from the appended claims.

For illustrative purposes the invention will be described in conjunction with the acompanying drawings in which.

Figure 1:
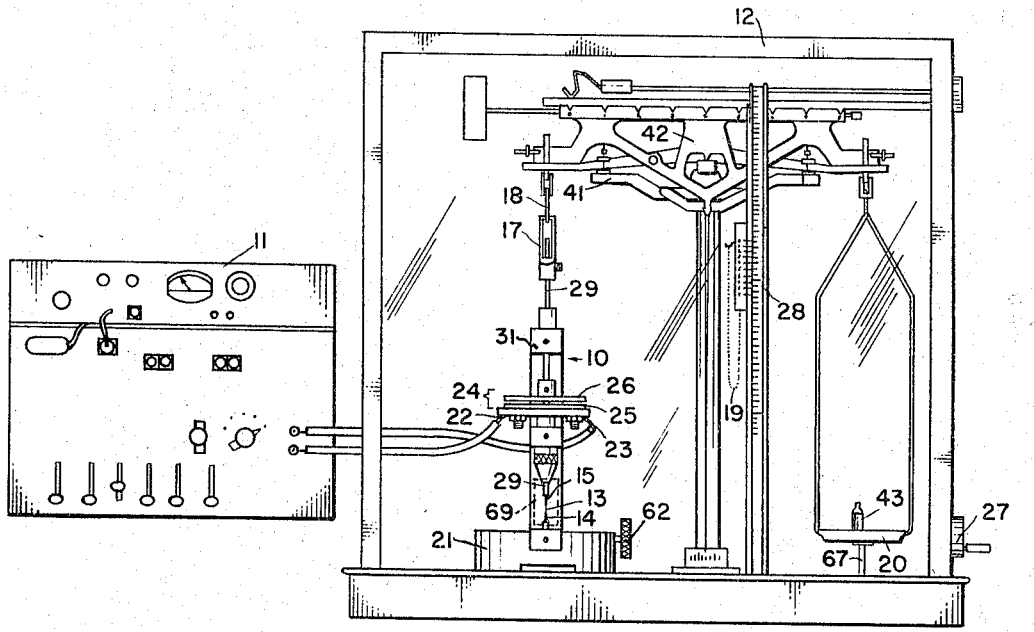
FIGURE 1 is a front view of the micro-tensile testing machine with the load and readout means.

Generally speaking, the fiber to be evaluated is mounted between two glass capillary rods and each end fastened with a suitable resin or cement. The lower capillary rod is held in a fixed position while the upper rod extends through a capacitor comprising a fixed and a movable plate. The fixed capacitor plate consists of two semicircular electrodes separated diametrically. The movable capacitor plate has a hole in the center through which is mounted a shouldered bushing with a set-screw to secure it to the upper capillary rod on which it slides. The electrode of the movable capacitor plate is annular and electrically isolated. The upper and lower capacitor plates are mounted so that the electrodes are facing each other and spaced a slight distance apart. Connections are made from the terminals fastened to the semicircular electrodes to a capacitance bridge of adequate sensitivity and range. The effective capacitance, measured in this manner, is about one-half the capacitance between one semicircular electrode and the annular electrodes. By connecting terminals to the semicircular electrodes, the movable upper annular electrode is not subject to variable loading and friction as would be the case if terminals and lead wires were fastened to both upper and lower capacitor plates.

When the whisker under test is mounted in position, the capacitance is measured when a load is applied just sufficient to take up all the clearances between cooperating parts. As the load is increased beyond that point, the fiber will stretch and the upper capacitor plate (and electrode) will move farther away from the fixed capacitor electrodes. This will cause a decrease in capacitance and may be plotted against the applied load and the extension of the fiber calculated.

In the particular embodiment shown in the drawings, the testing jig has been adapted to a standard analytical balance. The balance is dead weighted to compensate for the jig and the actual load is applied by a movable chain or by weights added to the right pan.

It is also possible to place a heating coil around the whisker so as to measure the strength of the whiskers at temperatures other than room temperature.

In the split capacitor design, the upper plate of the capacitor is a solid or a one-piece plate of plastic or ceramic having a metal conductor coating thereon. The lower plate is a solid plastic or ceramic disk having a metal conductor coating thereon in such a manner that a center strip is left uncoated and two capacitors in series are available. As the separation of the plates increases, the effective capacitance decreases.

The advantages over conventional testing means are obvious. As was previously stated, currently two beads are placed on the whisker and the extension is visually measured as a load is applied to the whisker. The present invention:

(1) Eliminates the necessity of direct visual measurement of extension.

(2) Measures the extension of the whisker by an electronic signal, as opposed to visual means, resulting in an extension resolving power on the order of 10 angstroms.

For a fuller understanding of the present invention, reference is now made to the drawings.

Figure 2:
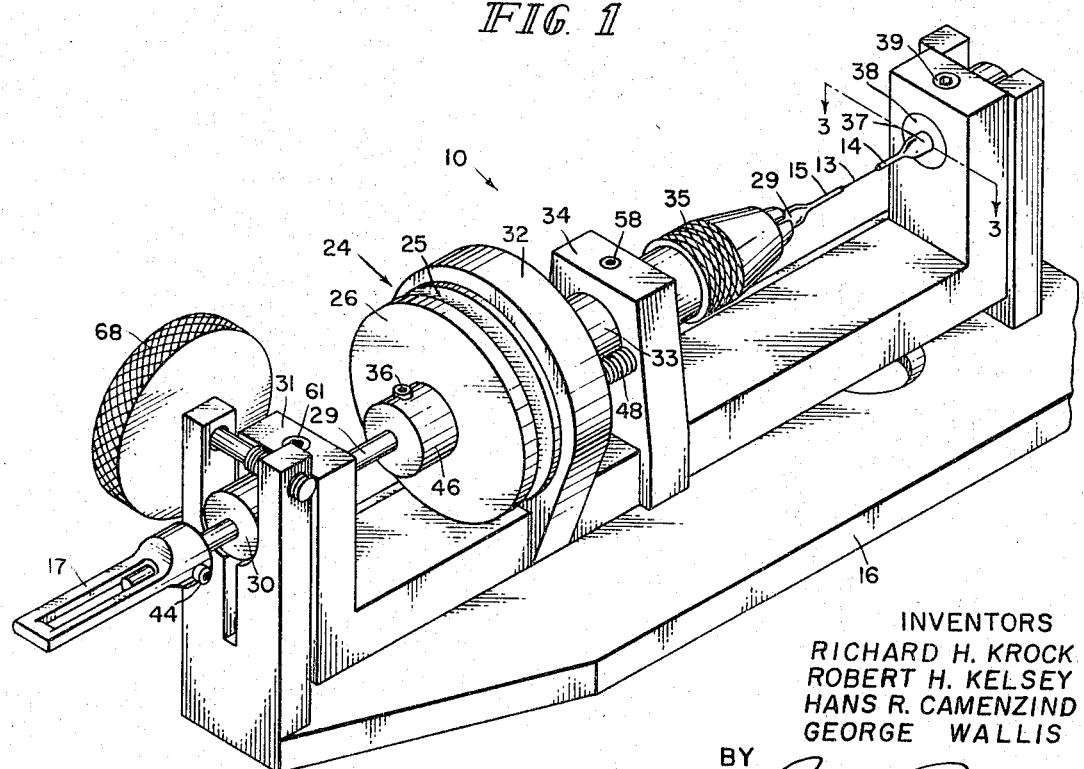
FIGURE 2 is an isometric view of the micro-tensile testing jig in its positioning bracket.
Figure 3:
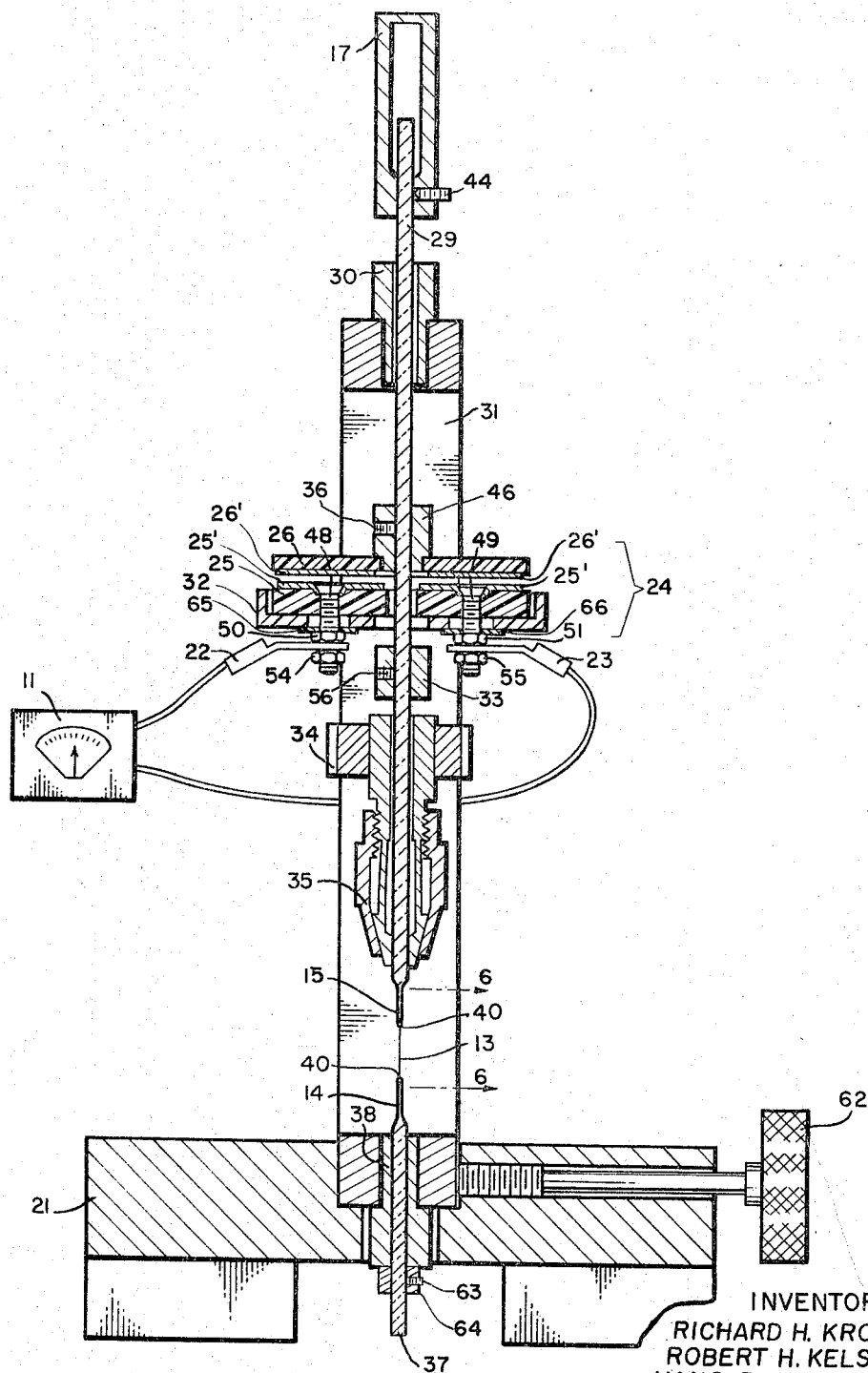
FIGURE 3 is a sectional view of the testing jig.

In FIGURE 1, testing jig 10 is used in conjunction with a capacitance bridge 11 and balance 12 to measure the load-elongation properties of filamentary-type materials such as whiskers. Whisker 13 is gripped between the capillary tubes 14 and 15 of jig 10 by fastening the whiskers in the capillary tubes with sealing wax or any other suitable substance. The whisker positioning and the measuring of the whisker length (separation between capillaries 14 and 15) and the crystallographic orientation and measurement of the cross-sectional area are carried out while jig 10 is positioned in horizontal cradle 16 as shown in FIGURE 2. The jig 10 is placed in a modified balance 12 by attaching the top eye 17 of jig 10 to load hook 18 of balance 12.

Balance 12 has been modified in several ways from the standard design. To reduce electrical interference, the balance is electrostatically shielded by placing a copper screen (not shown) around it. The conventional 0.1 gm. chain is replaced with a 100 gm. chain 19 so that the load can be applied continuously over this extended range by the fall of chain 19, rather than by the addition of separate weights to the right pan 20 of the balance. A support stand 21 for jig 10 is placed in the balance and secures jig 10 by set screw 62. Terminal lugs 22 and 23 attached to terminal screws 48 and 49 are provided for connecting capacitor 24 in balance 12 to capacitance bridge 11.

The initial capacitance between plates 25 and 26 of jig 10 is measured and, as a load is continuously applied by chain 19 which is varied by crank 27, the separation of the capacitor plates 25 and 26 increases and the decrease in capacitance is measured. The change in capacitance is inversely proportional to the change in length of the specimen. The change in capacitance divided by the initial capacitance is proportional to the strain in the whisker, while the stress is the applied load measured on scale 28 divided by the cross-sectional area of the whisker.

Referring now to FIGURE 2, the jig 10 is conveniently adjusted by placing it in horizontal cradle 16 and securing it by set screw 63. Upper rod is inserted through top collar 30 of yoke 31, movable capacitor plate 26, fixed split capacitor plate 25, capacitor bracket 32, stop collar 33, chuck bracket 34, and chuck 35, leaving about half an inch of rod 29 extending beyond the lower end of chuck 35. The chuck is closed, firmly gripping the support rod, and stop collar 33 is brought up snugly against chuck bracket 34 and locked in place with a set screw (not shown). This establishes the zero position for the system.

The movable capacitor plate 26 is supported by bushing 46 on upper rod 29 and adjusted to an initial separation from the fixed split plate 25 of approximately one-half millimeter and locked with set screw 36.

Bushing 38 is pressed tightly into the hole provided in yoke 31 and acts as a support for lower rod 37 which is inserted therein to a distance resulting in a spacing between the opposed tips of capillaries 14 and 15 equal to the specimen gauge length. Stop collar 64 is slipped over the lower rod 37 and butted against bushing 38 where it is locked in position by set screw 63. The lower rod 37 may then be locked in position by tightening set screw 39. By loosening set screw 39, the lower rod 37 may be removed and reinserted to its original position by butting stop collar 64 against bushing 38.

In mounting whisker 13, lower rod 37 is partly withdrawn. Under a microscope (not shown), the selected whisker is inserted in upper capillary tube 15 and a suitable cement is allowed to fill capillary tube 15 around whisker 13. Lower rod 37 is gently brought into position to receive whisker 13 and cemented in the same manner. Lower rod 37 should be positioned by lower stop collar 64 while the cement is liquid, and locked into place while setting by tightening set screw 39.

Figure 6:
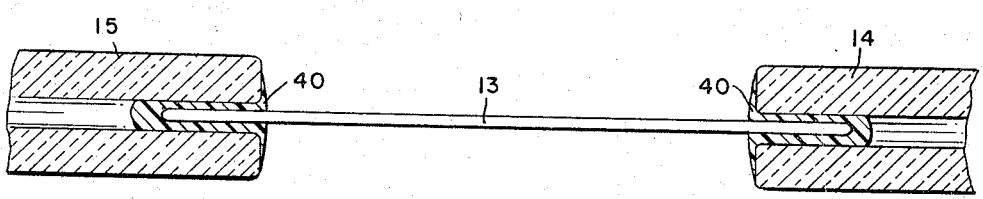
FIGURE 6 is a sectional view of the whisker and holding means therefor taken through section 6—6 of FIGURE 3.

FIGURE 6 is an enlarged view of the whisker 13 held in capillary tubes 14 and 15 by cement 40.

While jig 10 is in cradle 16, the unit may be placed under a microscope (not shown) and the dimensions of whisker 13 measured as a function of the angle of observation by rotating jig 10 in its cradle 16 which may be accomplished after loosening screw 68.

Testing jig 10 is then removed from cradle 16 and inserted in balance support 21 (FIGURE 1) with the beam 42 lowered on its support 41. The load hook 18 of balance 12 is hooked into the top eye 17 and locked into place by set screw 44. After electrical connections to 22 and 23 have been made, the beam 42 and the chuck 35 are released. When the pan arrest 67 is released, upper rod 29 is free.

Capacitance bridge 11 is then balanced to establish the zero position of the measuring system. Load may then be incrementally applied by the use of chain 19 or by the addition of weights 43 to pan 20, and the capacitance determined for each load.

Figure 4:
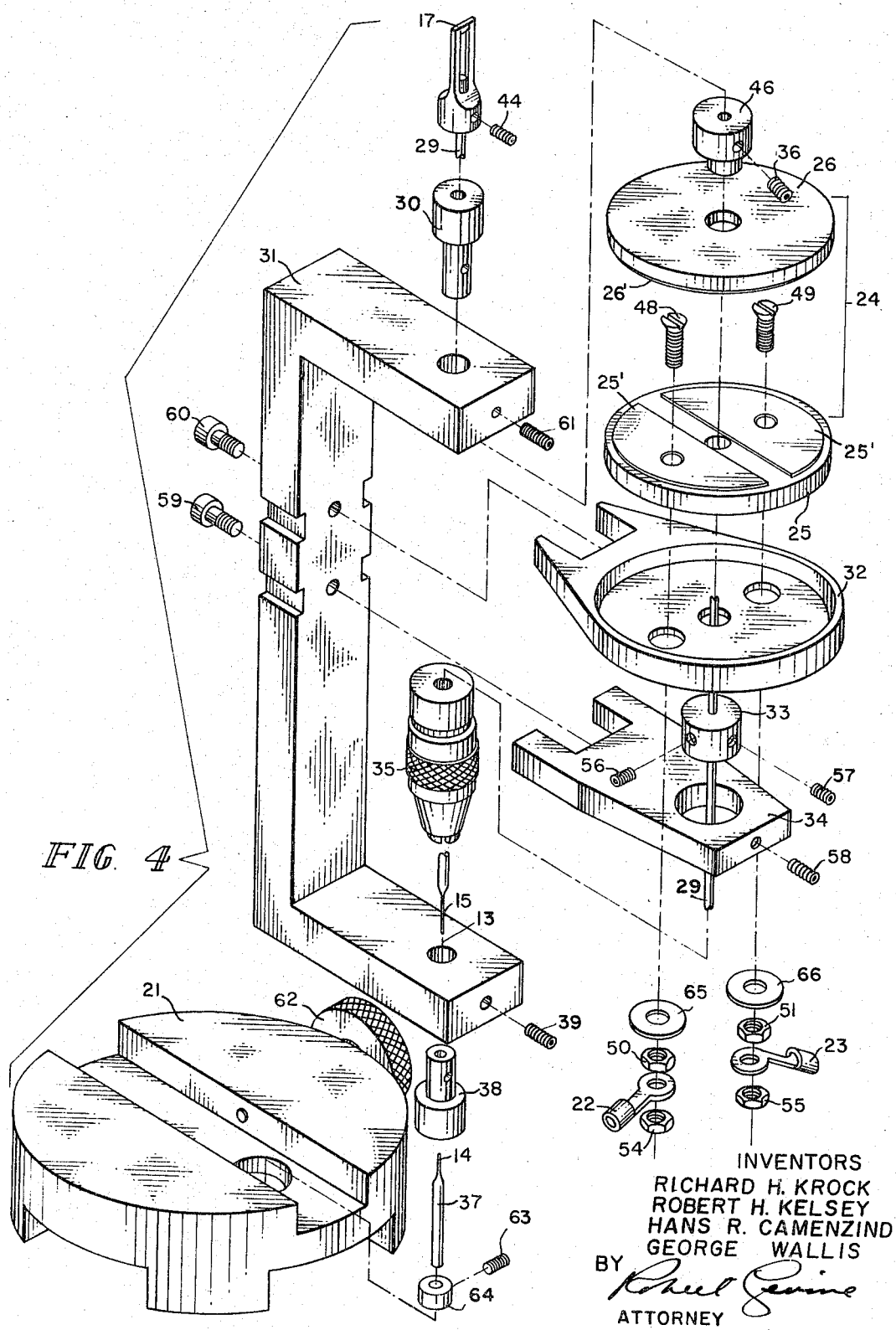
FIGURE 4 is an exploded view of the testing jig.

As can be seen in FIGURE 4, the lower capillary tube 14 is held fixedly in position, while the upper tube 15 is part of the upper rod 29 which moves as a load is applied to the whisker. It can further be seen that the lower split capacitor plate 25 is stationary while the upper movable capacitor 26 is attached to upper rod 29 and moves upwardly when a load is applied. Therefore, when the whisker 13 is enlongated, the distance between capillaries 14 and 15 increases, the distance between capacitor plates 25 and 26 increases by the same amount and the capacitance, which is measured by bridge 11, decreases. The stress-strain relation for whisker 13 may be calculated from data thus obtained, together with the whisker geometry and the initial capacitor-spacing calibration.

FIGURE 4 is an exploded view of jig 10 which fully shows the interrelation of parts. Upper rod 29 is positioned in top eye 17 of jig 10 and secured by set screw 44. Upper rod 29 transverses through bushing 30, yoke 31, bushing 46, movable capacitor plate 26, fixed split capacitor plate 25, capacitor bracket 32, positioning ring 33, and chuck 35 and extends beyond chuck 35. Bottom portion of rod 29 has capillary tube 15 fused thereto.

The split capacitor plate 25 is an important feature of the present invention. Plate 25 is fastened to supporting means 32 by screws 48 and 49, contacting electrodes 25' and secured by insulating washers 65 and 66 and by nuts 50 and 51. Terminal lugs 22 and 23 are fastened to terminals by nuts 54 and 55 and provide a means of attaching leads between capacitor 24 and read-out means 11. See FIGURE 1.

Figure 5:
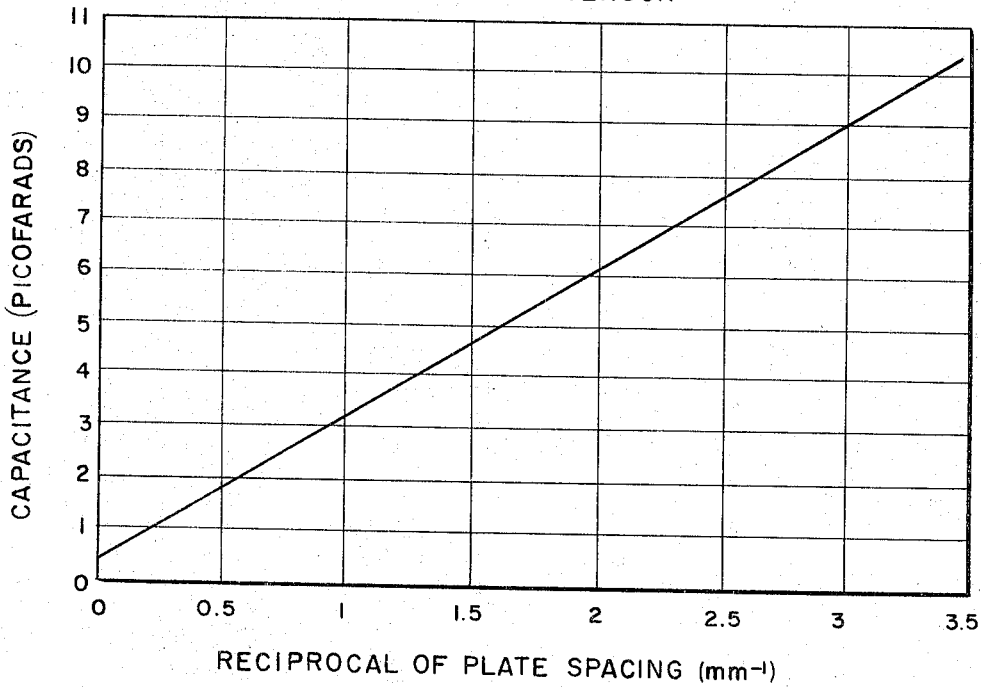
FIGURE 5 is a graph showing the relationship between capacitor plate spacing and capacitance.

FIGURE 5 shows the relationship between the plate spacing and capacitance.

Set screws 56 and 57 secure positioning ring 33 so that an initial reference position is established for the moving elements of the testing unit. Set screw 58 is permanently fastened to hold the chuck 35 firmly in place. The chuck holds rod 29 in position during mounting and preliminary observation of the fiber. Chuck alignment means 34 and capacitor support and alignment means 32 are secured to yoke 31 by screws 59 and 60 respectively.

Lower rod 37 having capillary tube 14 attached thereto is positioned in bushing 38, which is press-fitted into a hole in yoke 31. A stop collar 64 is slipped over the end of lower rod 37 and fastened to it by set screw 63. Set screw 39 clamps lower rod 37 in position. The yoke 31 is fitted into a slot in base 21 and held rigidly by means of set screw 62.

The jig as hereinbefore described in connection with a measuring apparatus, allows the determination of the load-elongation or stress-strain characteristics of inorganic or organic fibers. It is applicable to metal and ceramic whiskers, natural fibers such as silk, cotton and hair, and organic fibers as well.

A further use of the hereindescribed apparatus is to classify various tenderizers with respect to their effectiveness in reducing the toughness of meats. The effect of tenderizers on meats is concerned with a reduction in the toughness or stiffness or more precisely, the elastic modulus which can be measured with the present device.

It is also feasible to make these measurements at elevated temperatures by enclosing the space around the test speciment with a small electric heater made preferably, in two separate halves so it can readily be attached as shown in dotted outline of FIGURE 1 as heater 69.

There are many advantages of the present device over known testing devices: the jig may be completely removed from the measuring apparatus when mounting whiskers, making that operation less cumbersome; strain is measured electronically rather than optically, making feasible X-Y recordings and providing greater detection accuracy and resolution; variable drag on the load rod is eliminated by the split capacitance design; elevated temperature measurements can be made simply by placing a heating coil around the whisker; general ease of operation and maintenance; low cost; and excellent sensitivity with a load detection of 0.1 mg. and an extension detection of $1 \times 10^{-7}$ cm. length change.

The present device may be used as described or in conjunction with automatic read-out techniques. The capacitance bridge may be replaced with a direct reading capacitance meter which yields an analog voltage simply related to the capacitance being measured. This voltage may be used to drive one of the coordinates of an X-Y recorder. The use of chain loading permits continuous change in whisker loading, by coupling a motor, with suitable gearing, to the balance crankshaft. A slide wire, operated as a potentiometer, may be coupled to this motion to present a voltage analogous to the load. The capacitance and load signals may be combined with adjustable networks to compensate for variations in whisker area and gauge length and to allow direct drawing of the whisker stress-strain curve on an X-Y recorder.

It is to be understood that all matters as hereinbefore set forth are to be considered as illustrative and not in a limiting sense, and that all changes and modifications which do not depart from the spirit and scope of the present invention are to be included.

In accordance with proposed amendment of Rule 104, applicants herewith submit the results of their preliminary search as an aid to the Examiner: 2,222,221, R. K. Burford, Nov. 19, 1940; 2,323,724, A. Nadai et al., July 6, 1943; 2,645,151, C. H. Hastings et al., July 14, 1953; 2,671,199, J. A. Truitt, Mar. 2, 1954; 2,724,264, S. L. Dart et al., Nov. 22, 1955; 2,760,040, L. D. Statham, Aug. 21, 1956, 2,826,062, G. L. Brown et al., Mar. 11, 1958; 2,948,147, H. Roelig et al., Aug. 9, 1960; 3,039,051, H. Locher, June 12, 1962; 3,067,607, R. A. Crane et al., Dec. 11, 1962; 2,377,869, M. A. Elliott, June 6, 1945.

Microtensile Testing Machine, D. M. Marsh; Journal of Scientific Instruments, vol. 38, June 1961, pp. 229-234.

Tensile Strength of Whiskers, S. S. Brenner; Journal of Applied Physics, vol. 27, No. 12, December 1956.

Having thus described our invention, we claim:

1. A tensile testing apparatus for evaluating the mechanical properties of microscopic inorganic and organic fibers comprising: a first fixed rod and a second movable rod, capillary tubes affixed to an upper end of said fixed rod and a lower end of said movable rod; said first rod affixed to a first leg of a support member; said second movable rod traversing upwardly through a chuck, said chuck secured to and aligned by a middle portion of said support member and serving as a securing means for said second movable rod when a fiber is gripped between said fixed and movable rods by said capillary tubes, said chuck released during elongation of said fiber; said second movable rod further traversing upwardly through a capacitor carried by said support member, said capacitor comprising a fixed first plate and a floating second plate; said first plate being an insulative disc having a conductive coating on a top surface of said disc, a masked portion separating two halves of said insulative disc so as to effect two independent halves; said second movable rod further traversing through and affixed to said second capacitor plate, and through a second leg of said support member; hook means fastened to an upper extremity of said second movable rod; said hook means attached to a modified analytical beam balance at the point where a pan for an object to be weighed is normally attached; so that when a load is applied, said movable rod moves upwardly and thus said fiber is elongated, said floating capacitor plate also moving upwardly the same distance as the fiber elongation thus causing an increase in distance between said fixed and floating capacitor plates, said increase in distance resulting in a decrease in capacitance; said decrease in capacitance measured on a capacitance read-out means connected to each independent half of said first capacitor plate so that a series capacitance is measured, said capacitance being correlated to whisker elongation as a load is applied.

2. An apparatus for testing the tensile strength of microscopic inorganic and organic fibers having a capacitor means cooperating with an electric bridge means comprising a support member including first and second legs in spaced parallel relationship, chuck bracket means fixedly connected to said support member in spaced parallel relationship with said first and said second legs, chuck means secured to and aligned by said chuck bracket means, a fixed rod fixedly retained by one of said legs, said other leg providing alignment for said moveable rod, a movable rod projecting through said chuck means, said chuck means retaining said second movable rod as a fiber to be tested is gripped by said fixed and said movable rods, said chuck means released during elongation of said fiber, capacitor means including an apertured movable plate and an apertured fixed plate carried by said support member, said movable rod projecting through said aperture in said fixed plate and connected to said movable plate and projectiong through said aperture in said movable plate so that displacement of said movable rod displaces said movable plate, means connected to said movable rod for displacing said movable rod away from said fixed rod thereby elongating said fiber and displacing said movable plate away from said fixed plate of said capacitor, means, and electric bridge means connected to said capacitor means so as to detect the capacitance of said capacitor means as said movable plate is displaced, said capacitance indicative of fiber elongation.

3. A tensile testing apparatus for evaluating the mechanical properties of microscopic inorganic and organic fibers comprising: a first fixed rod and a second movable rod having hollow portions at adjacent ends for receiving a fiber to be tested; said first rod affixed to a first leg of a support member; said second movable rod traversing upwardly through a chuck, said chuck secured to and aligned by a middle portion of said support member and serving as a securing means for said second movable rod when a fiber is gripped between said fixed and movable rods, said chuck released during elongation of said fiber; said second movable rod further traversing upwardly through a capacitor carried by said support member, said capacitor comprising a fixed first plate and a floating second plate; said first plate being an insulative disc having a conductive coating on a top surface of said disc, a masked portion separating two halves of said insulative disc so as to effect two independent halves; said second movable rod further traversing through and affixed to said second capacitor plate, and through a second leg of said support member; hook means fastened to an upper extremity of said movable rod; said hook means attached to a load means so that when a load is applied, said second movable rod moves upwardly and thus said fiber is elongated, said floating capacitor plate also moving upwardly the same distance as the fiber elongation thus causing an increase in distance resulting in a decrease in capacitance; said decrease in capacitance measured on a capacitance read-out means; said read-out means connected to each independent half of said first capacitor plate so that a series capacitance is measured, said capacitance being correlated to whisker elongation as a load is applied.

4. A tensile testing apparatus for evaluating the mechanical properties of microscopic inorganic and organic fibers comprising: a first fixed rod and a second movable rod having hollow portions at adjacent ends for receiving a fiber to be tested; said first rod affixed to a first leg of a support member; said movable rod traversing upwardly through a means for securing said second movable rod when a fiber is gripped between said fixed and movable rods, said means for securing released during elongation of said fiber; said second movable rod further traversing upwardly through a capacitor carried by said support member, said capacitor comprising a fixed first plate and a floating second plate; said first plate being an insulative disc having a conductive coating on a top surface of said disc, a masked portion separating two halves of said insulative disc so as to effect two independent halves; said second movable rod further traversing through and affixed to said second capacitor plate, and through a second leg of said support member; hook means fastened to an upper extremity of said second movable rod; said hook means attached to a load means so that when a load is applied; said movable rod moves upwardly and thus said fiber is elongated, said floating capacitor plate also moving upwardly the same distance as the fiber elongation thus causing an increase in distance between said fixed and floating capacitor plates, said increase in distance resulting in a decrease in capacitance; said decrease in capacitance measured on a capacitance read-out means; said read-out means connected to each independent half of said first capacitor plate so that a series capacitance is measured, said capacitance being correlated to fiber elongation as a load is applied.

5. An apparatus for testing the tensile strength of microscopic inorganic and organic fibers having a capacitor means cooperating with capacitance bridge means comprising a support member including first and second legs in spaced parallel relationship, chuck bracket means fixedly connected to said support member in spaced parallel relationship with said first and said second legs, chuck means secured to and aligned by said chuck bracket means, a fixed rod fixedly retained by one of said legs, a movable rod projecting through said chuck means, said other leg providing alignment for said movable rod, said chuck means retaining said second movable rod as a fiber to be tested is gripped by said fixed and said movable rods, said chuck means released during elongation of said fiber, capacitor means including an apertured movable plate and an apertured fixed plate carried by said support member, said fixed plate carrying two electrically conductive halves electrically insulated from each other, said movable rod projecting through said aperture in said fixed plate and connected to said movable plate and projecting through said aperture in said movable plate so that displacement of said movable rod displaces said movable plate, means connected to said movable rod for displacing said movable rod away from said fixed rod thereby elongating said fiber and displacing said movable plate away from said fixed plate of said capacitor means, and capacitance bridge means connected to each conductive half of said fixed plate of said capacitor means so as to detect the series capacitance of said capacitor means as said movable plate is displaced, said series capacitance indicative of fiber elongation.

6. A tensile testing apparatus for evaluating the mechanical properties of microscopic inorganic and organic fibers comprising: a first fixed rod and a second movable rod; said first rod affixed to a first leg of a support member; said second movable rod traversing upwardly through a means for securing said movable rod when a fiber is gripped between fixed and movable rods, said means for securing released during elongation of said fiber; said second movable rod further traversing upwardly through a capacitor carried by said support member, said capacitor comprising a fixed first plate and a floating second plate; said first plate having two independent halves; said second movable rod further traversing through and affixed to said second capacitor plate, and through a second leg of said support member; hook means fastened to an upper extremity of said second movable rod; said hook means attached to a load means so that when a load is applied, said second movable rod moves upwardly and thus said fiber is elongated, said floating capacitor plate also moving upwardly the same distance as the fiber elongation thus causing an increase in distance between said fixed and floating capacitor plates, said increase in distance resulting in a decrease in capacitance; said decrease in capacitance measured on a capacitance read-out means; said read-out means connected to each independent half of said first capacitor plate so that a series capacitance is measured, said capacitance being correlated to fiber elongation as a load is applied.

7. A tensile testing apparatus for evaluating the mechanical properties of microscopic inorganic and organic fibers comprising: a first fixed rod and a second movable rod; said first rod affixed to a first leg of a support member; said second movable rod traversing upwardly through a means for securing said movable rod when a fiber is gripped between said fixed and movable rods, said means for securing released during elongation of said fiber; said second movable rod further traversing upwardly through a capacitor carried by said support member, said capacitor comprising a fixed first plate and a floating second plate; said first plate having two independent halves; said second movable rod further traversing through a positioning means for said second capacitor plate, and through a second leg of said support member; hook means fastened to an upper extremity of said second movable rod; said hook means attached to a load means so that when a load is applied, said second movable rod moves upwardly and thus said fiber is elongated, said floating capacitor plate also moving upwardly the same distance as the fiber elongation; a resulting decrease in capacitance measured on a capacitance read-out means; said read-out means connected to each independent half of said first capacitor plate so that a series capacitance is measured, said capacitance being correlated to fiber elongation as a load is applied.

8. A tensile testing apparatus for evaluating the mechanical properties of microscopic inorganic and organic fibers comprising: a first fixed rod and a second movable rod, capillary tubes affixed to an upper end of said fixed rod and a lower end of said movable rod; controllable heating means surrounding cooperating ends of said capillary tubes, said first rod affixed to a first leg of a support member; said second movable rod traversing upwardly through a chuck, said chuck secured to and aligned by a middle portion of said support member and serving as a securing means for said second movable rod when a fiber is gripped between said fixed and movable rods by said capillary tubes, said chuck released during elongation of said fiber; said second movable rod further traversing upwardly through a capacitor carried by said support member, said capacitor comprising a fixed first plate and a floating second plate; said first plate being an insulative disc having a conductive coating on a top surface of said disc, a masked portion separating two halves of said insulative disc so as to effect two independent halves; said second movable rod further traversing through and affixed to said second capacitor plate, and through a second leg of said support member; hook means fastened to an upper extremity of said second movable rod; said hook means attached to a modified analytical beam balance at the point where a pan for an object to be weighed is normally attached; so that when a load is applied, said movable rod moves upwardly and thus said fiber is elongated, said floating capacitor plate also moving upwardly the same distance as the fiber elongation thus causing an increase in distance between said fixed and floating capacitor plates, said increase in distance resulting in a decrease in capacitance; said decrease in capacitance measured on a capacitance bridge means connected to each independent half of said first capacitor plate so that a series capacitance is measured, said capacitance being correlated to whisker elongation as a load is applied.

9. An apparatus for testing the tensile strength of microscopic inorganic and organic fibers having a capacitor means cooperating with capacitance bridge means comprising a support member including first and second legs in spaced parallel relationship, a chuck bracket means fixedly connected to said support member in spaced parallel relationship with said first and said second legs, chuck means secured to and aligned by said chuck bracket means, a fixed rod including a capillary tube affixed to an upper extremity thereof fixedly retained by one of said legs, said other leg providing alignment for said movable rod, a movable rod including a capillary tube affixed to a lower extremity thereof projecting through said chuck means, said chuck means retaining said second movable rod as a fiber to be tested is gripped by said capillary tubes of said fixed and said movable rods, said chuck means released during elongation of said fiber, capacitor means including an apertured movable plate and an apertured fixed plate carried by said support member, said fixed plate carrying two electrically conductive halves electrically insulated from each other, said movable rod projecting through said aperture in said fixed plate and connected to said movable plate and projecting through said aperture in said movable plate so that displacement of said movable rod displaces said movable plate, hook means connected to said movable rod, a modified analytical beam balance connected to said hook means at the point where a pan for an object to be weighed is normally attached for displacing said movable rod away from said fixed rod thereby elongating said fiber and displacing said movable plate away from said fixed plate of said capacitor means a distance substantially equal to the elongation of said fiber, and capacitance bridge means connected to each conductive half of said fixed plate of said capacitor means so as to detect the series capacitance of said capacitor means as said movable plate is displaced, said series capacitance indicative of fiber elongation.

References Cited
UNITED STATES PATENTS
2,447,660  8/1948  Miklowitz _____ 73—103
2,802,178  8/1957  Shafer et al. _____ 317—246 X

OTHER REFERENCES
Brenner, S. S., Tensile Strength of Whiskers, Journal of Applied Physics, vol. 27, No. 12, December 1956, classified 73–95.

JAMES J. GILL, *Acting Primary Examiner.*

RICHARD C. QUEISSER, *Examiner.*

J. H. WILLIAMSON, *Assistant Examiner.*